June 5, 1973 F. MADER 3,737,366

SHEET-LIKE ELEMENT MADE OF PLASTICS MATERIAL

Filed Oct. 27, 1971 7 Sheets-Sheet 1

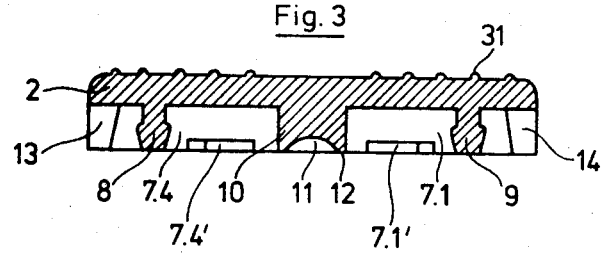
Fig. 3
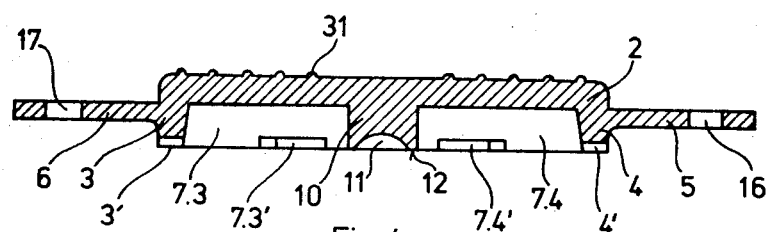
Fig. 4
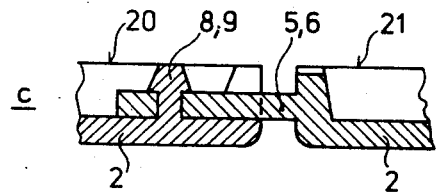
Fig. 5
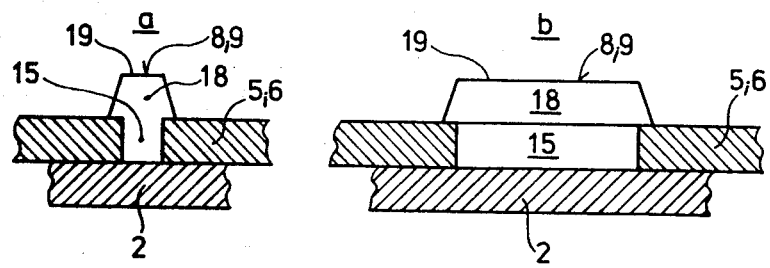

June 5, 1973  F. MADER  3,737,366

SHEET-LIKE ELEMENT MADE OF PLASTICS MATERIAL

Filed Oct. 27, 1971  7 Sheets-Sheet 3

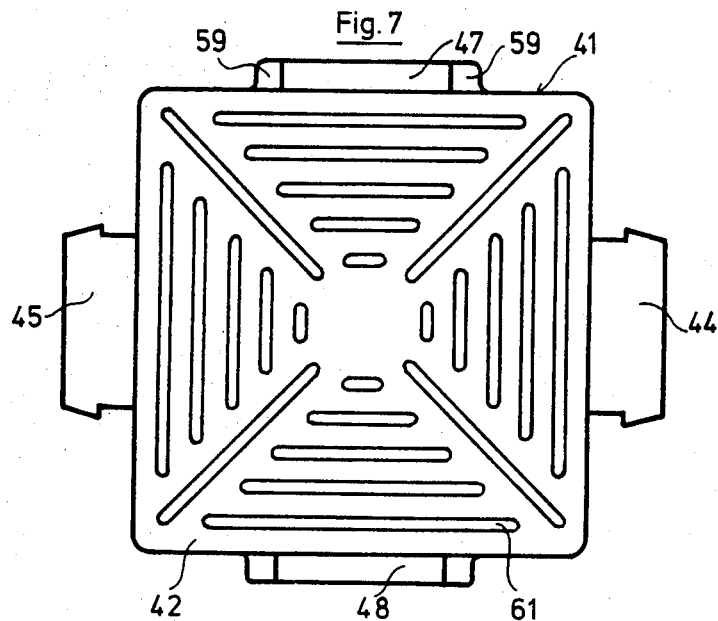
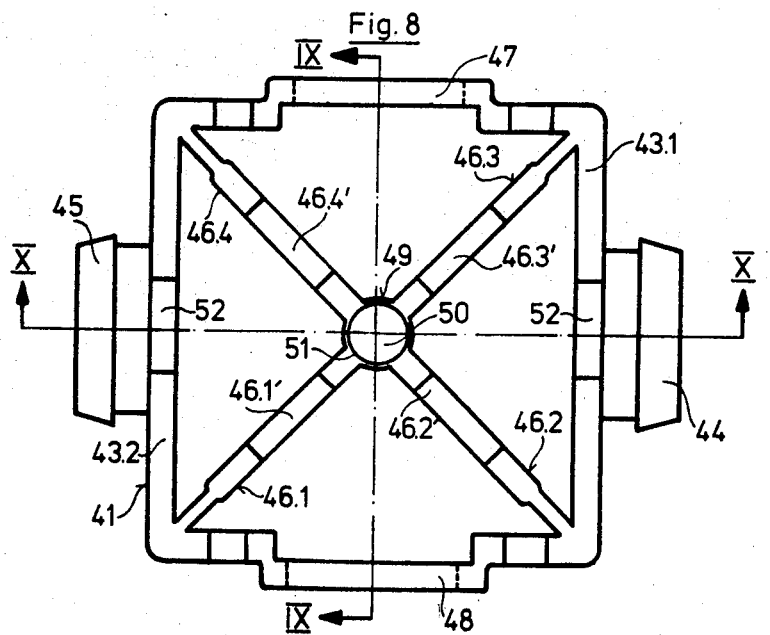

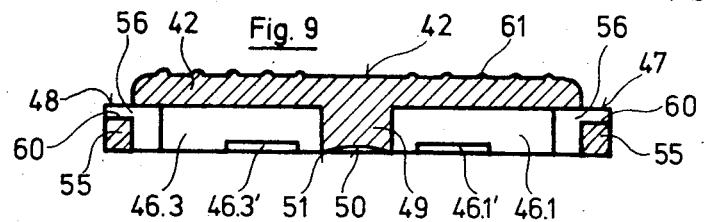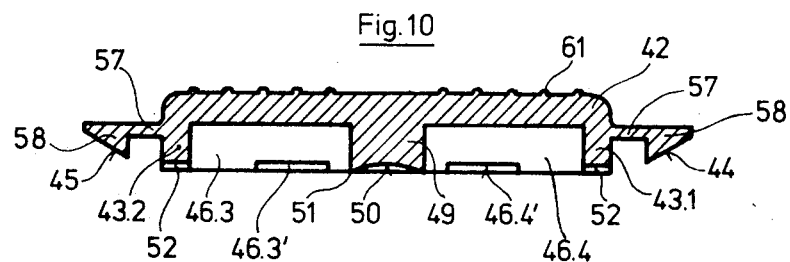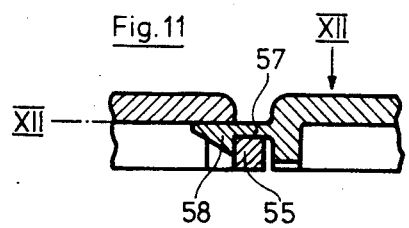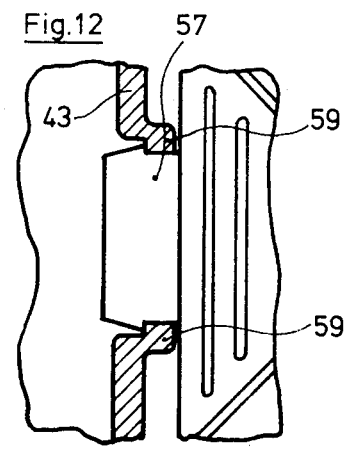

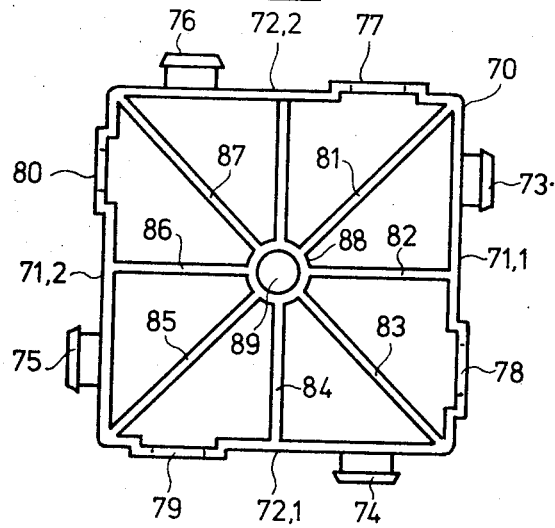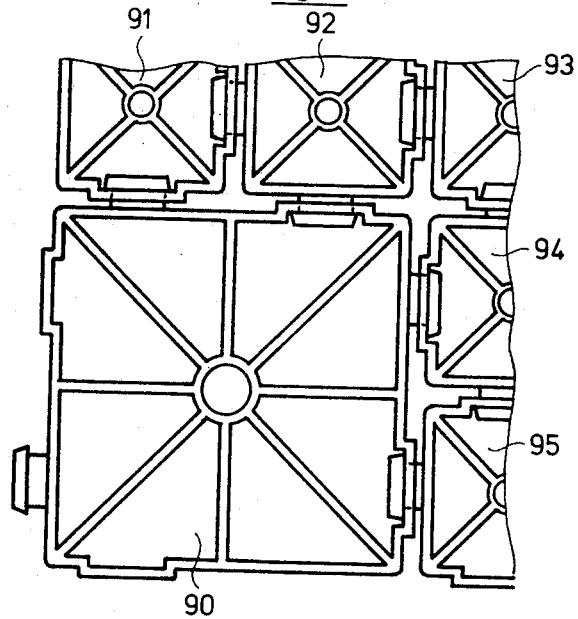

United States Patent Office 3,737,366
Patented June 5, 1973

3,737,366
SHEET-LIKE ELEMENT MADE OF
PLASTICS MATERIAL
Fritz Mader, Oberdorf, Switzerland, assignor to Matom AG., Niederdorf, Basel-Campagne, Switzerland
Filed Oct. 27, 1971, Ser. No. 192,965
Claims priority, application Switzerland, Oct. 27, 1970, 15,901/70
Int. Cl. B32b 3/06, 7/08
U.S. Cl. 161—48
8 Claims

ABSTRACT OF THE DISCLOSURE

A sheet-like element made of plastics material intended for fitting together with further elements to form a floor covering, said element having a practically square load-bearing surface, wall sections which project substantially vertically from one side of said load-bearing surface, serve as supports for the load-bearing surface and are flush with the periphery of the load-bearing surface, bar sections lying within said wall sections, connecting flaps provided on opposite wall sections, which connecting flaps project outward from the load-bearing surface for joining to an adjacent element, and connecting devices into which the connecting flaps of an adjacent element are intended to engage.

The present invention relates to a sheet-like element made of plastics material, intended for fitting together with further elements to form a floor covering which is particularly suitable for use in wet or moist areas.

Such floor coverings are particularly suitable for bathroom floors and shower cubicles, where a warmer covering is desired on the relatively cold stone floors.

Materials which have hitherto been disclosed, and can be more or less conveniently laid and taken up, for achieving a warm floor covering in bathrooms and shower cubicles suffer from the disadvantage that they either tend to rot (wooden boards, woven carpets and the like), or make it difficult to keep the floor clean because they are too heavy or are only available commercially in a size which in most cases is unsuitable.

The present invention aims to provide the materials for a floor covering for the said uses which permit the known disadvantages to be eliminated, the aim being above all to fit, without loss, the available material to the section of floor which is to be covered, and to provide practically unlimited capacity for extension.

The sheet-like element intended for fitting together with further elements to give a floor covering of the said type is characterized in that it possesses a practically square load-bearing surface and wall sections which project substantially vertically from one side of this load-bearing surface, serve as supports for the load-bearing surface and are flush with the periphery of the load-bearing surface, and bar sections lying within these wall sections, that two opposite wall sections are provided with connecting flaps which project outward from the load-bearing surface, for joining to an adjacent element, and that the element possesses connecting devices into which the connecting flaps of an adjacent element are intended to engage.

It is desirable to provide certain sections with parts which are recessed inwards towards the load-bearing surface in order to increase the specific surface pressure against a substrate. It is advantageous if a preferably central supporting section on the underside of the load-bearing surface possesses a recess provided within a continuous rim, so as to exert a suction effect on a substrate.

Figure 1:
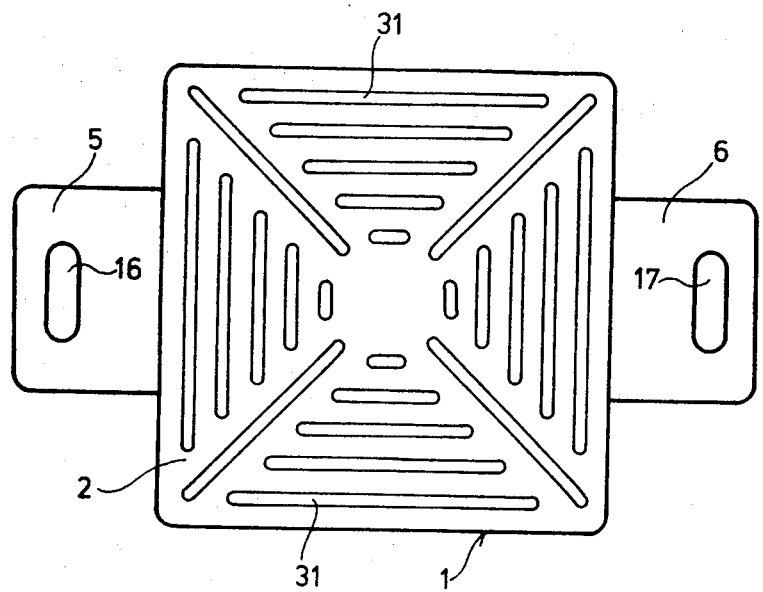
Figure 2:
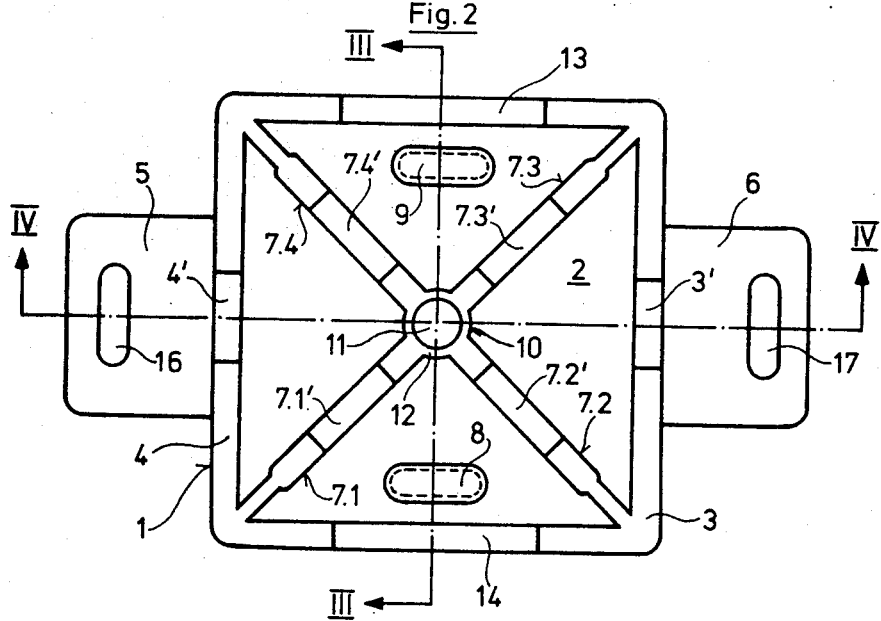
Figure 6:
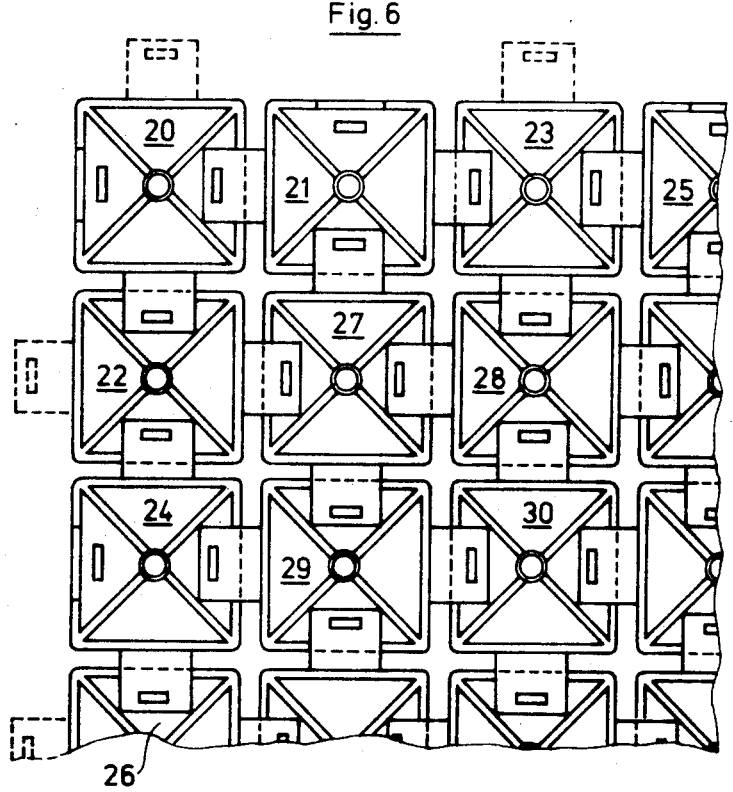
Figure 13:
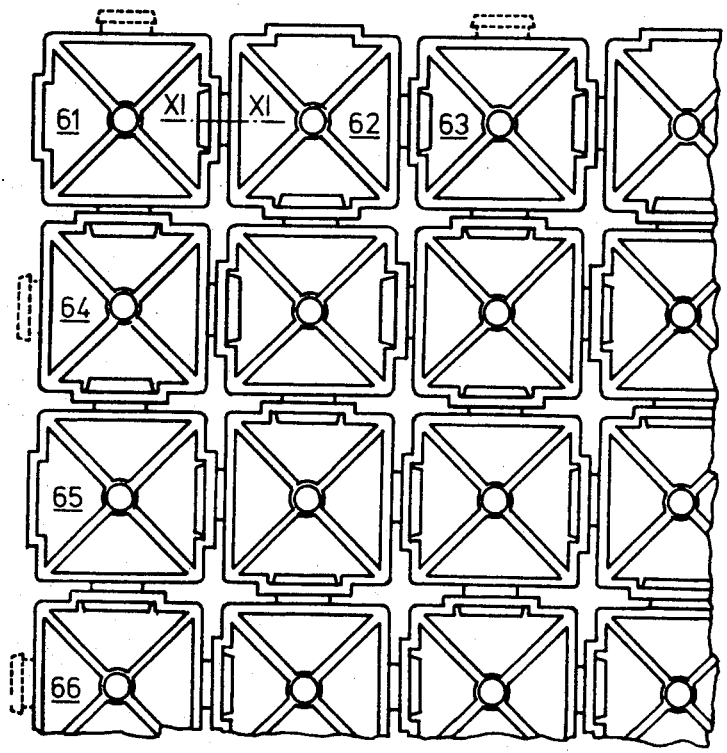

The invention will now be described, by way of example, with reference to the accompanying drawings, in which FIG. 1 is a plan of a first embodiment of a sheet-like element in accordance with the invention, FIG. 2 is an underside plan of the element of FIG. 1, FIG. 3 is a section taken along the line III—III of FIG. 2, FIG. 4 is a section taken along the line IV—IV of FIG. 2, FIG. 5 shows on a larger scale, one of the connecting devices of the element according to FIGS. 1–4, engaged with the connecting flap of an adjacent element, FIG. 6 is an underside plan of a corner portion of a floor covering built up from elements according to FIGS. 1–4, FIG. 7 is a plan of a second embodiment of a sheet-like element in accordance with the invention, FIG. 8 is an underside plan of the element of FIG. 7, FIG. 9 is a section taken along the line IX—IX of FIG. 8, FIG. 10 is a section taken along the line X—X of FIG. 8, FIG. 11 is a section taken along the line XI—XI of FIG. 13, FIG. 12 is a partial section view taken along the line XII—XII of FIG. 11, FIG. 13 is an underside plan of a corner portion of a floor covering built up from elements according to FIGS. 7–12, FIG. 14 is an underside plan of a third embodiment of a sheet-like element in accordance with the invention, and FIG. 15 is an underside plan of a corner portion of a floor covering built up from elements according to FIG. 14.

The surface element 1 shown in FIGS. 1 to 4 consists essentially of a load-bearing surface 2 which is partly surrounded on its underside by wall sections 3 and 4, two connecting flaps 5, 6 joined to opposite wall sections, bars 7.1–7.4 starting from the centre of the surface and lying along the diagonals, and two connecting plugs 8, 9, which are arranged opposite the sides of the load-bearing surface which are not provided with the connecting flaps 5, 6. At the region of intersection of the bars 7.1–7.4, in the centre surface, a supporting part 10 is formed on the load-bearing surface, and the part thereof which faces the surface on which the element is placed possesses a circular recess 11 surrounded by a continuous rim 12. This recess 11 in conjunction with a wet floor acts as a suction pad. The bars 7.1–7.4 are provided with recesses 7.1'–7.4', respectively, in their downwardly facing surfaces in order to increase the specific surface pressure on the floor. The wall sections 3 and 4 can for the same purpose be provided with recesses 3' and 4', respectively, as shown in FIGS. 2 and 4. An identical measure applied to the wall sections lying opposite the connecting plugs 8, 9, is unnecessary since, as shown in FIGS. 1 and 2, cut-outs 13, 14 are provided in these wall sections which serve for the lateral introduction of a connecting flap of an adjacent element. Both the recess 11 serving as a suction pad and the recesses 7.1'–7.4' serve to improve the adhesion to the floor of the floor covering built up of the elements shown.

The connecting plugs 8, 9 which serve to join adjacent elements are shown on a larger scale in FIG. 5, diagram *a* showing the narrow side and diagram *b* the broad side of one of the plugs. The plugs 8, 9 are preferably formed integrally with the underside of the load-bearing surface 2 shown in section, and have a neck section 15 of somewhat greater width and length dimensions than the corresponding dimensions of apertures 16, 17 in the connecting flaps 5, 6, in which the plugs 8, 9 are intended to engage. On top of the neck section 15 there is a head section 18 of which the top surface 19 is of somewhat smaller width and length dimensions than the said apertures 16, 17. The underside of the head section 18, on the other hand, projects on all sides beyond the neck section 15 as far as is necessary to produce a secure snap connection between a first element, marked 20 in diagram c of FIG. 5, and a second element 21, adjacent to the first element 20. The remaining details, shown in FIG. 5c, are marked with the same reference numbers as in the FIGS. 1–4 and 5a, 5b which have already been described.

In order to achieve the desired connection between adjacent surface elements, it is of course also possible to use "press-stud" connecting devices of other forms than those shown. It is also possible to provide connecting devices in which certain parts of adjacent elements are welded to one another.

In order to be able to roll up the floor covering built up from elements according to FIGS. 1 to 4 in the manner indicated in FIG. 6, it is necessary that at least the connecting flaps 5, 6 should be flexible. Since the elements are preferably produced in one piece, it is advisable to use a flexible plastics material, for example low pressure polyethylene. In a practical embodiment of elements of approx. 40 mm. side length, connecting flaps of approx. 17 mm. width and approx. 1.4 mm. thickness were used. Their length was so chosen that the distance maintained between opposite wall sections of adjacent elements was approximately half the thickness of an element. It will be understood that this spacing is not critical for the build-up of the floor covering; the flaps can, without difficulty, be so constructed that the elements are closer together or further apart, so as to serve the actual task. However, if it is to be possible to roll up the floor covering and the elements themselves have a certain intrinsic stiffness (in order to withstand pressure stresses), an appropriate distance between adjacent elements is necessary.

The surface element 41 shown in FIGS. 7–12 consists essentially of a load-bearing surface 42 which is surrounded, along the greater part of its periphery, by vertically projecting wall sections 43.1, 43.2, two connecting flaps 44, 45 joined to opposite wall sections, bars 46.1–46.4 starting from the centre of the surface and disposed along the diagonals, and two connecting parts 47, 48 which are joined to the wall sections 43.1, 43.2 which are not provided with connecting flaps. At the point of intersection of the bars 46.1–46.4 in the centre of the surface, a supporting part 49 is formed on the load-bearing surface and the part thereof which faces the surface on which the element is laid possesses a circular recess 50 surrounded by a continuous rim 51. This recess 50 in conjunction with a wet floor acts as a suction pad. The bars 46.1–46.4 are provided with recesses 46.1'–46.4', respectively in their downwardly facing surfaces in order to increase the specific surface pressure on the floor. It is possible for the same purpose, as shown in FIGS. 8 and 10, to provide the wall sections with recesses 52 in the region of the connecting flaps 44 and 45. Both the recess 50 serving as a suction pad and the recesses 46.1'–46.4' serve to improve the adhesion to the floor of the carpet built up from the elements shown.

The connecting parts 47, 48 which serve to join adjacent elements lie, as can be seen from FIGS. 7, 8 and 9, on the sides of the load-bearing surfaces 42 which are not provided with connecting flaps, and a rib 55 projects beyond the wall sections 43.1, 43.2 which surround the load-bearing surface. The ribs 55 are preferably integrally bonded to the wall sections in question and form the lower limit of an aperture 56 which extends upwards as far as the underside of the load bearing surface 42. The width and height of the aperture 56 is matched to the relevant dimensions of the bar section 57 on the connecting flaps 44, 45, as can be seen from FIGS. 11 and 12. A barb 58 is formed on the outer end of each bar section 57 and is intended to engage behind the rib 55 (FIG. 11). The barb 58 is, as shown in FIG. 12, preferably somewhat broader than the bar section 57, so that its two lateral ends can also engage behind the connecting parts 57 of the ribs 55 on the wall sections 43.1, 43.2, whereby an optimum push-fit connection between two adjacent surface elements is achievable.

It will be understood that, as already mentioned in the case of the surface element according to FIGS. 1–6, this push-fit connection can also be made of a different shape in order to achieve the intended connection without additional means.

In order to be able to roll up the floor covering built up from elements according to FIGS. 7 to 10 in the manner shown in FIG. 13, at least the bars 57 of the connecting flaps 44, 45 must be flexible. Since in this second embodiment, the elements are also preferably made in one piece, it is here again advisable to use a flexible plastics material, such as low pressure polyethylene. In a practical embodiment of elements of approx. 40 mm. side length, bars of approx. 15 mm. width and approx. 1.1–1.3 mm. wall thickness were provided. In order to increase the ease of rolling up the floor covering produced from the elements according to FIGS. 7–12 it is advisable to construct the upper surface of the rib 55 of the connecting parts 47, 48, this rib facing the load-bearing surface 42 and marked 60 in FIG. 9, so that it slopes inwards. As the floor covering is normally rolled up with the walking surface on the inside, the flexing of the bar section 57 and the deformation of the rib 55 can be reduced by the indicated slope of the rib surface.

The amount by which the rib 55 projects beyond the outside of the wall sections 43.1, 43.2 is appropriately chosen in accordance with the desired minimum roll diameter of the floor covering. Since, in this embodiment, adjacent elements must touch one another at least over a length corresponding to the contact zone of the barb, in order to achieve a connection which is free of play, the end face of the rib 55 at the same time serves as a stopping surface for the adjacent element, and the requisite mutual spacing of the peripheral walls of adjacent elements is determined by the width of the rib or by the amount by which the end face of the rib projects beyond the peripheral wall of the element.

As can be seen from FIGS. 6 and 13, one connecting flap, shown in broken lines, of the elements marked 20, 22, 26 and 23, or 61, 63, 64 and 66, projects beyond the edge formed by the edges of the load-bearing surfaces. In order to be able fully to utilise the advantages of identical constructional units in manufacture, sale and use, it is advisable to make all parts identically the same and if necessary to cut off the flaps which project when a floor covering of the desired shape has been made. As a rule this presents no problem in the case of elements manufactured from plastics material, especially when using a soft material, such as low pressure polyethylene.

On the other hand it is also possible to fix a separate edge, surrounding the floor covering, to these projecting flaps or to use them to hold the floor covering to the floor.

It can be seen from FIGS. 6 and 13, that all connections between the surface elements lie below the load-bearing surfaces. Hence, a floor covering consisting of the elements which have been described does not possess any parts which project beyond the load-bearing surfaces and the connecting points are all shielded from wear or damage resulting from the load-bearing surfaces being walked on. The upper face of the load-bearing surfaces is appropriately provided with an anti-slip profile which, as shown in FIGS. 1, 3, 4 and 7, 9, 10, can consist of a number of ridges 31 or 61, or recesses (not shown), arranged in a decorative pattern and formed in the load-bearing surface. It can easily be seen from FIGS. 6 and 13 that a floor covering built up in this way can be extended at any time by connecting further surface elements onto the existing edge portions.

It is obvious that instead of a single lateral connecting flap 5, 6 (FIGS. 1 and 2) or 44, 45 (FIGS. 7 and 8) it is also possible to provide several flaps separated by interspaces, which engage in appropriately shaped connecting devices on the adjacent element.

FIG. 14 shows a surface element 70 which possesses a connecting flap 73–76, which can be designed like the connecting flaps according to FIGS. 7, 8, 10 and 11, on each of all the four wall sections 71.1, 71.2, 72.1 and 72.2. At a distance from the connecting flaps 73–76, a connecting device 77–80 is provided, again on all of the said wall sections of this surface element, and these connecting devices can be shaped like the connecting parts 47, 48 according to FIGS. 7, 8, 9, 11 and 12. It is obvious that in order to reinforce the connecting members between adjacent surface elements, the wall sections which face one another can also each be provided with more than one connecting flap 73–76 and correspondingly each with more than one connecting device 77–80 and one connecting flap can be followed by one or more further connecting flaps or by a connecting device per flap. In the former case, all connecting devices then of course lie alongside one another, spaced apart by dividing sections. On the surface element itself, individual connecting devices or groups thereof preferably follow individual connecting flaps or groups thereof around the surface element. The embodiment shown is preferentially suitable for surface elements of relatively large side length and correspondingly large surface area. Correspondingly, the number of the load-bearing ribs 81–87, which are only shown schematically, is also somewhat greater than in the case of the embodiments previously shown. Their shape can correspond to that according to FIGS. 2–4 and 8–10. In the centre of the surface element, a supporting part marked 88 is again provided, with can be of the same shape as in FIGS. 2–4 and 8–10 and can be provided with a suction recess 89. This supporting part can, of course, be omitted or several of them can be provided. Thus, in the case (not shown) where the surface sections subdivided by the bars 81, 83, 85 and 87 are halved by a further diagonal bar each, the bar intersection points thereby produced can also be provided with such supporting parts 88.

As already pointed out, the surface element shown in FIG. 14 is preferably intended for embodiments of fairly large surface area. The way in which surface elements of smaller base outline can be joined onto surface elements of this size is shown in FIG. 15. This figure shows a surface element 90 according to FIG. 14 which is adjoined all round (shown at the top and at the right in FIG. 15) by smaller surface elements 91–85, in the way already shown in FIGS. 11 and 12. In order to secure the advantages, already described, of a floor covering built up from such surface elements it is advisable for the side length of an element 90 to be a multiple of the side lengths of the elements 91–95. It is obvious that instead of the two smaller elements 91–95 shown per side wall part of the large element 90, it is, of course, also possible to provide more than two. Of course, it is necessary to ensure in this case that the requisite connecting flaps 71–74 and connecting parts 76–79 are provided on the large surface element.

The floor covering to be produced can be provided with numerous patterns through suitable colouration of the elements.

What is claimed is:

1. A sheet-like element made of plastics material intended for fitting together with further elements to form a floor covering, said element having
   (a) a practically square load-bearing surface,
   (b) wall sections which project substantially vertically from one side of said load-bearing surface, serve as supports for the load-bearing surface and are flush with the periphery of the load-bearing surface,
   (c) bar sections lying within said wall sections,
   (d) connecting flaps provided on opposite wall sections, which connecting flaps project outward from the load-bearing surface for joining to an adjacent element, and
   (e) connecting devices into which the connecting flaps of an adjacent element are intended to engage.

2. An element according to claim 1, in which parts of the wall sections and bar sections are provided with recesses towards the load-bearing surface in order to increase the specific surface pressure on a substrate.

3. An element according to claim 1, in which a preferably central supporting part possesses, on the underside of the load-bearing surface, a recess provided within a continuous rim in order to achieve a suction effect on a substrate.

4. An element according to claim 1, in which the connecting devices for joining to adjacent elements possess plugs provided with undercuts, and each connecting flap possesses at least one receiving orifice into which the relevant plug or plugs of an adjacent element are intended to engage.

5. An element according to claim 1, in which the connecting devices for joining to adjacent elements each comprise an aperture and a contact rib and each connecting flap is provided with a barb which is intended to engage with the corresponding contact rib of an adjacent element.

6. An element according to claim 1, in which at least a part of the connecting flap is resiliently movable at right angles to the plane of the load-bearing surface.

7. An element according to claim 1, in which the upper face of the load-bearing surface is provided with an anti-slip profile.

8. An element according to claim 1, in which all of the wall sections mentioned are each provided with an equal number of connecting flaps and connecting devices which are each arranged individually or in groups next to one another and spaced apart from one another and in such a way that an individual flap or a group thereof is followed by an individual connecting device or a group thereof.

References Cited

UNITED STATES PATENTS

| 1,948,327 | 2/1934 | Berwick | 161—123 X |
|---|---|---|---|
| 2,372,520 | 3/1945 | Rubin | 161—37 |
| 2,680,698 | 6/1954 | Schnee | 161—37 X |
| 2,810,671 | 10/1957 | Taylor | 161—118 X |

WILLIAM A. POWELL, Primary Examiner

U.S. Cl. X.R.

156—91, 304; 161—37, 44, 54, 69, 112, 118, 149